United States Patent
Rohrer

(10) Patent No.: US 10,788,010 B2
(45) Date of Patent: Sep. 29, 2020

(54) HIGH CAPTURE EFFICIENCY WAVE ENERGY CONVERTER WITH IMPROVED HEAVE, SURGE AND PITCH STABILITY

(71) Applicant: Rohrer Technologies, Inc., York, ME (US)

(72) Inventor: John W. Rohrer, York, ME (US)

(73) Assignee: ROHRER TECHNOLOGIES, INC., York, ME (US)

(*) Notice: Subject to any disclaimer, the term of this patent is extended or adjusted under 35 U.S.C. 154(b) by 15 days.

(21) Appl. No.: 16/153,688

(22) Filed: Oct. 5, 2018

(65) Prior Publication Data
US 2019/0040840 A1    Feb. 7, 2019

Related U.S. Application Data

(63) Continuation-in-part of application No. 15/285,539, filed on Oct. 5, 2016, which is a continuation-in-part (Continued)

(51) Int. Cl.
*F03B 13/18* (2006.01)
*F03B 13/10* (2006.01)
*F03B 13/20* (2006.01)

(52) U.S. Cl.
CPC .......... *F03B 13/182* (2013.01); *F03B 13/10* (2013.01); *F03B 13/1855* (2013.01); *F03B 13/20* (2013.01); *F05B 2270/18* (2013.01)

(58) Field of Classification Search
CPC .......... F03B 13/18; F03B 15/00; F03B 13/14; F01B 13/264; F01D 15/10; F01D 15/20
See application file for complete search history.

(56) References Cited

U.S. PATENT DOCUMENTS

| 1,887,316 A | 11/1932 | Lockfaw |
| 3,644,052 A | 2/1972 | Lininger |

(Continued)

FOREIGN PATENT DOCUMENTS

| DE | 4143011 | 4/1993 |
| WO | WO 2008/135046 | 11/2008 |

(Continued)

*Primary Examiner* — Shafiq Mian
(74) *Attorney, Agent, or Firm* — Lorusso & Associates

(57) ABSTRACT

A means for improving the motion stability of a floating, semi-submerged, or submerged body used in, multi-capture-mode wave energy converters (WECs) having two or more bodies, against wave-induced heave, surge, and pitching forces, while reducing the size, mass and cost of such bodies or bases, thus improving the relative motion and hence capture efficiency of such WECs over a broad spectrum of wave periods and wave heights. Stabilizing counter moments against wave-induced motion are substituted by strategic placement of drag plates or planes entraining seawater mass or water-filled cavities within, or attached to, the bases and/or at least one tensioned seabed-affixed cable. The base or reaction-body stabilizing means is disclosed in a two-body multi-capture-mode, deep-water, surface-deployed, wave-terminator-type WEC to concurrently increase wave energy capture efficiency and reduce the volume, mass, and capital cost of the WEC's stabilized reaction body or base.

19 Claims, 10 Drawing Sheets

Related U.S. Application Data of application No. 14/530,723, filed on Nov. 1, 2014, now Pat. No. 9,863,395, which is a continuation-in-part of application No. 14/101,325, filed on Dec. 9, 2013, now Pat. No. 9,127,640, which is a continuation-in-part of application No. 13/506,680, filed on May 8, 2012, now Pat. No. 8,614,520.

(60) Provisional application No. 62/762,534, filed on May 8, 2018, provisional application No. 62/707,920, filed on Nov. 24, 2017.

(56) References Cited

U.S. PATENT DOCUMENTS

| | | | |
|---|---|---|---|
| 3,651,870 A | 3/1972 | Calkins | |
| 3,963,079 A | 6/1976 | Carlucci | |
| 4,098,084 A | 7/1978 | Cockerell | |
| 4,170,738 A | 10/1979 | Smith | |
| 4,170,898 A | 10/1979 | Salter | |
| 4,179,886 A | 12/1979 | Tsubota | |
| 4,180,005 A | 12/1979 | Zumbahlen | |
| 4,212,254 A | 7/1980 | Zumbahlen | |
| 4,295,800 A | 10/1981 | Packer | |
| 4,408,455 A | 10/1983 | Montgomery | |
| 4,426,950 A | 1/1984 | Cholet | |
| 4,718,231 A | 1/1988 | Vides | |
| 5,066,867 A | 11/1991 | Shim | |
| 5,132,550 A | 7/1992 | McCabe | |
| 5,921,082 A * | 7/1999 | Berling | F03B 13/1815 290/42 |
| 5,929,531 A | 7/1999 | Lagno | |
| 6,109,029 A * | 8/2000 | Vowles | B01D 61/10 270/42 |
| 6,595,725 B1 | 7/2003 | Shotbolt | |
| 7,130,269 B2 * | 10/2006 | Nie | H04L 47/10 370/235 |
| 7,737,568 B2 * | 6/2010 | Vowles | F03B 13/14 290/42 |
| 7,878,734 B2 | 2/2011 | Bull | |
| 8,264,095 B2 | 9/2012 | Camp | |
| 8,317,555 B2 | 11/2012 | Jacobsen | |
| 8,508,063 B2 | 8/2013 | Rhinefrank | |
| 8,614,520 B2 | 12/2013 | Rohrer | |
| 9,127,640 B2 | 9/2015 | Rohrer | |
| 10,094,356 B2 | 10/2018 | Rohrer | |
| 2002/0067043 A1 | 6/2002 | Ovadia | |
| 2006/0208494 A1 | 9/2006 | Cook | |
| 2008/0093852 A1 | 4/2008 | Vowles | |
| 2008/0169653 A1 | 7/2008 | Olson | |
| 2010/0140944 A1 | 6/2010 | Gardiner | |
| 2010/0213710 A1 | 8/2010 | Rhinefrank | |
| 2010/0317244 A1 | 12/2010 | Jacobsen | |
| 2011/0068579 A1 | 3/2011 | Dullaway | |
| 2012/0032446 A1 * | 2/2012 | Rohrer | F03B 13/1815 290/53 |
| 2012/0317970 A1 | 12/2012 | Edvardsen | |
| 2012/0319406 A1 | 12/2012 | Hoffmann et al. | |
| 2013/0081388 A1 | 4/2013 | Straume | |
| 2014/0338321 A1 | 11/2014 | You | |
| 2015/0082785 A1 | 3/2015 | Rohrer | |
| 2015/0252777 A1 | 9/2015 | Rhinefrank et al. | |
| 2017/0363058 A1 | 12/2017 | Etherington | |
| 2019/0040840 A1 | 2/2019 | Rohrer | |

FOREIGN PATENT DOCUMENTS

| | | |
|---|---|---|
| WO | WO 2011/065841 | 6/2011 |
| WO | WO 2011/071390 | 6/2011 |
| WO | WO 2012/053899 | 4/2012 |
| WO | WO 2017/062528 A2 | 4/2017 |

* cited by examiner

RTI F2 QD with Mono-SPAR

HIGH CAPTURE EFFICIENCY WAVE ENERGY CONVERTER WITH IMPROVED HEAVE, SURGE AND PITCH STABILITY

CROSS-REFERENCE TO RELATED APPLICATIONS

This application claims the benefit of U.S. Provisional Application Ser. No. 62/707,920, filed Nov. 24, 2017 and U.S. Provisional Application Ser. No. 62/762,534, filed May 8, 2018, the contents both of which are incorporated in their entirety herein by reference. This is a Continuation-In-Part of U.S. Regular Utility application Ser. No. 15/285,539, filed on Oct. 5, 2016, now U.S. Pat. No. 10,094,356, issued Oct. 9, 2018, which claimed the benefit of U.S. Provisional Application Ser. No. 62/284,640 filed Oct. 5, 2015, and which is a Continuation-In Part of U.S. Regular Utility application Ser. No. 14/530,723, filed Nov. 1, 2014, now U.S. Pat. No. 9,863,395, issued Jan. 9, 2018, which is a Continuation-In-Part of U.S. Regular Utility application Ser. No. 14/101,325, filed Dec. 9, 2013, now U.S. Pat. No. 9,127,640, issued Sep. 8, 2015, which is a Continuation-In-Part of U.S. Regular Utility application Ser. No. 13/506,680, filed May 8, 2012, now U.S. Pat. No. 8,614,520, issued Dec. 24, 2013, and claims the benefit of U.S. Provisional Application Ser. No. 62/284,640 filed Oct. 5, 2015, the contents all of which are incorporated in their entirety herein by reference.

FIELD OF THE DISCLOSURE

This disclosure relates to an improved means to stabilize a floating or semi-submerged apparatus such as a floating offshore wind turbine base or other floating marine platform against undesirable wave and wind-gust-induced motion. More particularly, the disclosure relates to an improved means for stabilizing a floating or semi-submerged wave-energy capture apparatus in water against undesirable motion produced by wave or wind forces applied directly to a base or frame or reaction body or indirectly by a first body or float attached to the second body in such a manner to permit the transmission and the conversion of such wave or wind forces applied to the first body.

The disclosure is utilized to stabilize a second reaction body or base of a multi-body Wave Energy Converter (WEC), utilized for converting ocean wave energy into electricity, against wave induced forces applied to a first or adjacent body(s) or floats through drive arms or hinged joints connected to a Power Take-Off (PTO) affixed to either body or base.

BACKGROUND OF THE DISCLOSURE

Ocean waves are produced primarily by wind, which is produced by solar energy. While ocean wave energy is a huge global renewable energy resource, usually with several times higher energy density (watts/meter$^2$) than the wind energy producing waves (as wave energy passes through a near surface vertical plane parallel to oncoming wave fronts), solar and wind (including shallow water offshore wind) have dominated global renewable energy capacity additions in recent years. Ocean wave energy and wind energy deployed in favorable sites have comparable 30% to 45% annual capacity factors. Since both utilize "free" renewable energy, CapEx (capital expense per MW of capacity) becomes the dominant competitive factor.

Utility-scale wave farms require WECs that can provide a levelized cost of power (LCOP) competitive with solar, wind, and other renewables. Renewables do not incur significant fuel costs and, like offshore wind farms, do not utilize on-site operators. Like offshore wind farms, maintenance and depreciation costs are likely to be a fixed portion of initial installed capital expenses (CapEx/MW). Estimated wave farm annual capacity factors are also estimated to be comparable to wind farms (at 30%-45%). This makes CapEx/MW the primary determinant of WEC economic viability. To obtain competitive minimum CapEx/MW, WECs will likely have to be deployed on the ocean surface in deep water where wave energy is greatest. Competitive WECs will also likely have to capture both heave (vertical or potential) and surge (kinetic or lateral) wave energy (multi-mode capture), each comprising exactly 50% of total wave energy in deep water (depth over ½ average wave length). Multi-mode WECs operating on the surface in deep water require at least two linked bodies, at least one floating and moving in reaction to wave heave and surge forces, and a second body resisting the movement of the first body through a power take-off (PTO) mechanism converting the force derived from the relative motion between the bodies. While a surface buoy with a seabed-attached tensioned-cable drive requires only one floating body, it can only capture heave and not significant surge wave energy.

Wave energy's delayed commercialization is due in large part to the profusion of unique ocean Wave Energy Converter (WEC) design concepts being proposed resulting in the lack of "convergence" on a generally recognized "best WEC" (most cost effective and reliable WEC design). The high capital cost (CapEx/MW) and low wave energy capture efficiency of the few first-generation WEC designs, which have proceeded to ocean trials at large scale to date, have also dampened investment interest. Today's offshore wind farms (primarily located in Europe) that use turbines with seabed affixed towers are limited to about 50 meters sea depth. Wind turbines with floating bases facilitate wind farms at greater depths.

The key to lower WEC CapEx/MW is low weight (since both offshore wind turbines and WECs use similar marine steel and composite structures and have similar electrical components). In floating marine vessels, including ships, vessel weight is largely determined by vessel volume. There is a growing recognition that deep-water-deployed, terminator-type WECs using broad-beam surface floats, which can intercept a maximum amount of energy containing wave fronts per cubic meter of volume, per tonne, and hence per cost of float volume purchased, may emerge as the most cost competitive (CapEx/MW) utility scale WECs.

Many semi-submerged floating marine bodies or vessels, including WECs and deep-water-deployed offshore wind turbines on floating semi-submerged bases, require lateral (surge), vertical (heave), and/or pitch (rotational) stability of their bases or frames or reaction bodies against wave or wind-force-induced motion, for acceptable performance. Most WECs deployed in deep water on the ocean surface (where wave energy is highest) utilize two or more linked bodies wherein the wave induced relative lateral, pitching, or heaving motion between such bodies are dampened by, and drive, at least one Power Take-Off (PTO) mechanism capturing electric, hydraulic, or pneumatic energy. If the PTO damping force between linked bodies is too large or at least one of the bodies (the base or reaction body) is too small, then the relative motion between the linked bodies is reduced to the point where captured wave energy work (the wave force X of the relative motion between bodies) also is reduced. If the PTO damping force is too weak, relative motion between the bodies increases but less wave energy work is also captured. A reaction body can be motion stabilized if it is large enough to span at least two wave crests but with typical ocean wave lengths of 100-300 meters, this can become cost prohibitive.

Another method of motion stabilizing a floating marine body, such as with the use of at least one or two or more linked WEC bodies, is to make at least one body substantially more voluminous and massive than the other floating or semi-submerged body (bodies) or utilize a fixed body like the seabed, a seawall, seabed-affixed tower, piling, or other fixed structure as the reaction body. For example, one or more surface floats can be mechanically linked to a more massive barge or larger float. Because the cost (CapEx) of marine bodies and vessels are approximately proportional to their volume and displacement or weight, increasing the size, weight, and hence cost of at least one WEC body to stabilize that body and increase the relative motion between linked bodies can be economically unaffordable. Using seabed affixed structures in deep water can also be cost prohibitive and can prevent WECs or floating wind turbine bases from pivoting or self-orienting into the oncoming wave or wind direction, or to rise or fall to accommodate tidal changes in the Still Water Line or "SWL".

It is also possible to increase the PTO-damped relative motion between two or more linked WEC bodies by delaying the lateral (surge) or pitch (rotational) recovery of one WEC body by designing each with very different natural frequencies (determined by mass distribution, moment of inertia, center of buoyancy, and hydrodynamic drag properties) and the timing and application of the PTO-damping force in such manner that the first body (or base) is returning (recovering) from the prior wave-induced displacement while the next wave crest is concurrently moving the second-linked body (bodies) (or floats).

It is often desirable to also reduce the wave-induced vertical (heave) motion of at least one semi-submerged body or reaction body. This is often accomplished by incorporating or attaching to the first body (or base) one or more substantially vertical spars or frame members or beams or columns that protrude deeply into the water column (typically 15-30 meters deep) where the water is relatively calm, and either attaching high-density ballast near the bottom of such spar(s) or column(s), or attaching a drag plate of relatively large horizontal surface area near the bottom of such vertical spars which plate entrains water mass above and below it to thus reduce the base-attached spar's vertical motion.

High wave-energy-capture-efficiency WECs must absorb a majority of both heave (potential or vertical component) and surge (kinetic or lateral component) wave energy (multi-mode energy capture), as each represents 50% of total wave energy in "deep water" (depths exceeding ½ average wavelength). These are often referred to as multi-capture-mode WECs. WECs that only move vertically (including axisymmetric "point absorber buoys") only capture a portion of the heave wave-energy component and little or no surge component. WECs employing predominantly lateral displacement bodies, (like near-shore, shallow-water-deployed "surge flap" type WECs), capture only a portion of the "surge" wave component and little "heave" energy. A WEC float must employ substantial concurrent vertical and lateral displacement to capture a substantial portion of both heave and surge wave energy.

Most single body WECs (surface floats attached to the seabed with tensioned cables) are ineffective at capturing surge wave energy (50% of total wave energy) and their axisymmetric shape provides negative economies of scale (float-vessel volume or area increases exponentially when diameter and capture width increase linearly). Two body WECs, which are deployable on the ocean surface in deep water (where wave energy is greatest), can utilize wide broad-beam floats oriented or self-orienting parallel to oncoming wave fronts and be configured to capture both heave and surge wave energy. Detrimentally they do, however, require the cost of a second (reaction) body, which is usually at least as massive (hence as costly) as the first (surface float) body. Most two or multi-body WECs become progressively less efficient as wave periods increase from small choppy five-second waves to larger, more energetic fifteen-second swells, and as applied, PTO damping forces are increased. Both cause one floating body to rotate or translate less relative to the second or adjacent floating body which reduces the relative motion (and hence energy capture) between them.

It is highly desirable to have the second (or reaction) body be much smaller than, and weigh substantially less than (hence cost less than), the first body to which wave forces are applied and yet have the second body well stabilized against wave or induced forces. This can be accomplished by judiciously using second-body-entrained seawater mass and/or at least one tensioned cable seabed attachment (allowing the seabed to provide at least part of the second body mass). For most WECs with two or more linked bodies, maximum wave energy capture requires varying the damping force using complex damping force algorithms—including at times, the application of reactive or input power—throughout each wave cycle.

Objects of the Disclosure

The objects and principles of the present disclosure are primarily described and illustrated using deep-water-deployed, terminator-type WECs that utilize one or more adjacent elongated wave-front parallel surface floats which floats concurrently move both vertically and horizontally in response to both wave-induced heave and surge forces for the advantageous low CapEx/MW and higher capture efficiency reasons described previously. The objects and principles of the present disclosure, however, are also applicable to, and inclusive of, other types of WECs, including axisymmetric and non-axisymmetric one and two-body point absorbers, hinged multi-body articulators, and oscillating water column (OWC) WECs, among others and also to other semi-submerged floating bodies including offshore floating wind turbine bases and other floating marine platforms.

One object of the present disclosure is to substantially reduce undesired wave, wind, and/or PTO-induced surge or lateral motion, heave or vertical motion, or pitch or rotational motion, or to increase desirable delayed recovery of such motions, to surface, semi-submerged and submerged marine bodies utilized in WECs, floating wind turbine bases or other buoyant marine structures by applying counter moments that oppose such wave or wind-induced motions. Such counter moments can be provided by: a. water mass entrained via rigid or flexible judiciously positioned drag plate or plane surfaces attached to the body(bodies) to be motion stabilized; b. water mass contained or entrapped within rigid or flexible-walled judiciously positioned vessels attached to such bodies; and/or c. judiciously positioned cable or spar attachments secured to the stabilized bodies directly or indirectly attached to the seabed or seabed-affixed structures.

Another object of the present disclosure is to provide a two-body WEC wherein the displaced volume, mass, (and hence potential cost), of the second stabilizing body is substantially less than the first (float) body while maximizing the wave-induced relative motion between the bodies throughout a broad spectrum of wave periods and wave heights.

A further object of the present disclosure is to configure the linkage and applied damping forces between two WEC bodies so as to prevent the wave forces applied to the WEC's floating first body from substantially moving the second body in such directions that the relative motion between the two bodies is substantially reduced.

A still further object of the present disclosure is to increase the "relative motion" between two attached WEC bodies beyond what is obtainable by maintaining the second body relatively stationary to the first body by establishing substantially different natural frequencies for each body (as determined by the mass distribution, center of gravity, moment of inertia, center of buoyancy, and hydrodynamic drag of each), by adjusting the first to second body linkage configuration, by adjusting the level and timing of PTO-applied damping forces, or any second-body-to-seabed connection such that the first floating body is moving upward and/or rearward in response to wave-induced forces while the second body is concurrently moving downward and/or forward, i.e., rebounding from a prior wave, during at least a part of most wave cycles, thus increasing the relative motion and hence the power capture between the two bodies (wanted relative motion).

Another object of the present disclosure is to more effectively and efficiently utilize entrapped, (as in tanks, enclosed vessels, or bladders), or entrained, (as in drag plates or planes), seawater, rather than expensive steel, composites, concrete structural materials or other mass, attached to, or integral with, the first or second body to economically and effectively reduce or eliminate unwanted relative motion or increase wanted motion between the two bodies.

A further object of the present disclosure is to attach the second body to the seabed either directly through at least one tensioned cable, through an intermediate structure or a buoyant body attached to the seabed with at least one tensioned cable, or to attach the second body to the seabed through a seabed-affixed piling or tower, such attachment configured to apply a moment against the second body to reduce or eliminate unwanted relative motion or increase wanted relative motion between the WEC's first floating body and the second body.

A further object of the present disclosure is to configure the intermediate attachment between the WEC's second body and the seabed-attached tensioned cables such that unwanted relative motion between the bodies is reduced or wanted relative motion is increased while eliminating or reducing the need for means to enhance the second body's mass such as by using drag plates or enclosures to entrap or entrain seawater mass.

A further object of the present disclosure is to achieve any of the prior-stated objects while providing a WEC with one or more adjacent wave-front parallel surface floats that remain self-orienting to oncoming wave fronts and/or self-adjusting to tidal changes to the mean water level or still water line (SWL).

A further object of the present disclosure is to achieve any of the prior objects while providing a WEC producing reduced energy loss from "back waves" caused when the WEC surface floats are forced rearward and upward, while being resisted by PTO-damping forces, by wave crests impacting the float front or buoyantly lifting the at least one float.

A further object of the present disclosure is to achieve at least one of the prior stated objects while providing a WEC with one or more surface floats securely protected from the waves of severe sea states by the total submergence of the floats via force (pulling or rotating the floats substantially below their normal operating depth), by flooding part or all of the floats' interior cavities to reduce the floats' buoyancy, or by combinations of both force and seawater flooding.

A further object of the present disclosure is to achieve at least one of the prior objects while providing a means to adjust a WEC's first and/or second body's submerged depth for tidal compensation, performance optimization, or de-tuning protection during severe sea states by altering the mass or submerged depth of the first and/or second bodies by mechanical means or by admitting or exhausting seawater into ballast tanks or cavities within or affixed to the bodies.

A further object of the present disclosure is to achieve at least one of the prior objects while directly utilizing a geared or ungeared WEC rotary electric generator (power take-off or PTO) to eliminate the need for costly intermediate hydraulic or pneumatic power-conversion equipment and their attendant large capital costs (CapEx) and efficiency losses.

A further object of the present disclosure is to disclose a WEC with high wave-energy-capture efficiency over a broad spectrum of wave periods and wave heights typically found in the higher wave-energy sea-condition locations found around the world, typically from about five to fifteen second wave periods and from about one to about five-meter wave heights.

SUMMARY OF THE DISCLOSURE

It is desirable to have the first floating body as wide as possible and oriented parallel to oncoming wave fronts to intercept the maximum amount of energy contained in a wave front per unit float volume, mass, and hence cost. While it is possible to have one or more second body(bodies) hinged to the first body in the form of a large float or barge of comparable (or larger) surface area, volume, mass, and hence cost, it is preferable, if possible, to have the second "reactive body" substantially smaller in volume, mass, and cost while still allowing maximum wave-force-induced relative motion between the first (float) and the second (reactive) body.

The present disclosure allows use of a low-volume, low-mass, low-cost second reactive body in a two-body WEC that incorporates a seabed mass, connected to the second reactive body by at least one tensioned cable in a unique configuration, to supplement the second reactive body mass and stabilize the body against wave-induced forces applied to it by the first body (float) through resistive torque or force from the PTO.

This is accomplished by using a mooring beam rigidly attached to the second body and extending substantially forward (up sea) from the center of buoyancy of the first (float) body (or combined WEC center of Buoyancy) to a mooring or pivot point located substantially below the still water line (SWL) held in a relatively fixed position by one or more tensioned cables to the seabed.

Combined heave (vertical) and surge (lateral) wave forces acting on the WEC's first (float) body and transmitted to the WEC's second reactive body through resistive force (torque) transferred through the PTO would otherwise cause the reactive body to both rise (in response to wave heave) and concurrently move rearward or rotate rearward (in response to wave surge). This movement and rotation would substantially reduce the relative motion between the two bodies and hence the energy captured (which is equal to force or torque times travel distance). Gravity would return both bodies to their initial positions during ensuing wave troughs.

By selecting both optimum lateral and vertical dimensions between the first float center of buoyancy and the fixed mooring or pivot point, a moment is applied to the second reactive body (about the mooring or pivot point) by lateral wave-surge forces that substantially counters a moment (also about the mooring or pivot point) by vertical wave heave forces. It is recognized that the magnitude of wave heave and surge forces acting upon the float at any time during a typical 5-15 second ocean wave period will not always be equal. Selection of optimal vertical and lateral dimensions are, therefore, based on average forces. Additional stabilization of the reaction body and/or the mooring or pivot point can be supplemented with placement of drag plates affixed to either having horizontal and/or vertical areas.

Distinguishing Features from the Prior Art

The Salter-Edinburgh Duck, and several modern Duck derivatives, including the Columbia StingRay, WEPTOS WEC, and Brimes Energy Jellyfish, like the present disclosure, have one or more adjacent surface floats that collectively have a port-to-starboard width or beam wider than their fore-to-aft depth (broad-beam float) which broad beam float(s), like the present disclosure, are oriented (or self-orienting) parallel to prevailing or oncoming wave fronts. Unlike the present disclosure, however, these Duck derivatives have their float(s) attached proximate to, or integral with, a massive, costly semi-submerged central cylinder with a cross-sectional area, volume, mass, and therefore, likely cost substantially exceeding the cross-sectional area of their float(s). The central cylinder internals, including any PTO and any supplemental ballast within or below the cylinder(s) do not rotate with the float and provide part or all of the second reactive body mass opposing the wave-induced float motions. Additional second-body reactive mass in some "Duck Derivatives" is provided by connecting multiple non-rotating central cylinder internals with adjacent cylinder internals.

The Columbia StingRay also has a wide-beam float immediately fore of a large non-rotating semi-submerged central cylinder (named a nacelle) but unlike most Duck derivatives, the fore float is detached from the central cylinder and connected to its PTO, located within the cylinder, by a drive arm. The StingRay also has a second aft float attached to a second PTO, also located within the central cylinder, by a second drive arm. The combined cross-sectional area of the fore and aft floats is substantially less than that of the massive central cylinder. The StingRay also utilizes the twin vertical spar frame with lower drag plate previously disclosed (but not claimed) by Rohrer in U.S. Pat. No. 8,604,631 for additional stability.

The Azure WEC (formerly WET-NZ WEC) utilizes a single float directly hinged at its fore end to a rotary input PTO (a crankshaft driving at least one linear hydraulic cylinder) located on or within a twin vertical spar frame. Unlike the present disclosure, the float lacks any drive arm connection to its PTO input and its center of buoyancy is located aft of the spar frame and PTO pivot point.

Both the Chinese Sharp Eagle "Wanshan" and the Akers Solutions Aker WEC also utilize broad-beam fore floats which, like the StingRay and the present disclosure, are connected by drive arms to rotary input PTOs mounted on large "second reaction body" barges with mass and cross-sectional areas several times larger than their fore floats. The pivot or hinge points between drive arms and the PTO rotary inputs of the Sharp Eagle are substantially above the still water line (SWL). The Akers WEC, like the present disclosure, has its pivot point substantially below the water line. The Australian Perpetuwave also utilizes broad-beam floats connected by drive arms to PTOs mounted above the SWL to a seabed affixed stationary frame.

There are also multiple examples of two-body (or multi-body) hinged surface floats or rafts including the current Irish Sea Power Platform, the Mocean WEC, Dutch DEXA-Wave and Crestwing WECs, and the older Pelamis and Cockerell's Raft. All these articulating raft-type WECs employ two or more hinged surface floats or rafts using either rotary input PTOs (input at the raft or platform hinge points) or linear input PTOs (spanning the raft hinges) which capture the wave-induced relative motion between adjacent floats or rafts. These articulating raft WECs have a fore-to-aft dimension substantially larger than their beam width. Two linked rafts oriented perpendicular to oncoming wave fronts must have a substantial combined fore-to-aft length, ideally spanning ½ of a typical ocean wave length (75 to 150 meters) for maximum relative motion and energy capture between the rafts. Such twin-raft WECs intercept relatively little energy-containing wave front considering their large, and hence expensive fore-to-aft length and float volumes (hence costs) and their relative motion and hence capture efficiency is very dependent upon the fixed fore-to-aft length chosen versus the actual wave length experienced at any given time.

The present disclosure and the prior disclosures of which this is a continuation-in-part are distinguished from the prior art based on the following elements:

1. A multi-bodied WEC has an aft reaction body and a broad-beam fore float (or multiple adjacent floats collectively forming a broad-beam fore float) wherein the aft reaction body has a volume or mass substantially less than the fore float(s).
2. The broad-beam fore float(s) oriented (preferably self-orienting) substantially parallel to oncoming wave fronts.
3. The fore float(s) rotatably connected by at least one drive arm to a PTO in, or on, the aft reaction body at a pivot point or axis aft of the fore float's center of buoyancy and substantially below the SWL.
4. The at least one drive arm with attached fore float is rotatable a full 360° about the pivot point or axis without mechanical interference with the aft reaction body (eliminating severe sea "end stop" problems).
5. The fore float is fully submergible during severe sea conditions either by applying sufficient rotational force through the drive arms and/or by partially or fully flooding with seawater at least one cavity in the fore float to reduce or eliminate its buoyancy.

Application Ser. No. 15/286,539 (Issuing as patent Ser. No. 10/094,356 on Oct. 9, 2018) of which this application is a CIP adds the following additional element (among others);

6. the aft reaction body being or including a mono-spar which contains or has affixed at least one PTO with at least one drive axel driven by at least one drive arm connected to each of the at least 2 floats.

The present disclosure and the disclosures in U.S. Provisional Application Nos. 62/707,920 and 62/762,534 now include the following additional elements:

7. The pivot point or axis on the aft reaction body is at least partially stabilized against undesirable wave-induced rotational and/or translational motion by a fore beam or member rigidly connected to the aft reaction body and extending substantially forward of the fore float's (floats') center of buoyancy, the fore beam being pivotably connected to a mooring buoy or mooring point which buoy or point is connected to the seabed by at least one tensioned cable, spar, piling, or structure.

8. The vertical and horizontal distances between the float's (floats') center(s) of buoyancy and the mooring buoy or mooring point is chosen such that the moment produced by wave lateral or surge forces applied to the float(s) is substantially countered by the opposing moment produced by wave vertical heave or buoyant forces applied to the float(s) thus reducing undesirable rotation about, or translation of, the reaction body PTO axis or pivot point, which reaction body rotation or translation would otherwise reduce the relative motion between the reaction body and float(s) and the resultant energy capture.

DETAILED DESCRIPTION OF THE DISCLOSURE

Figure 1:
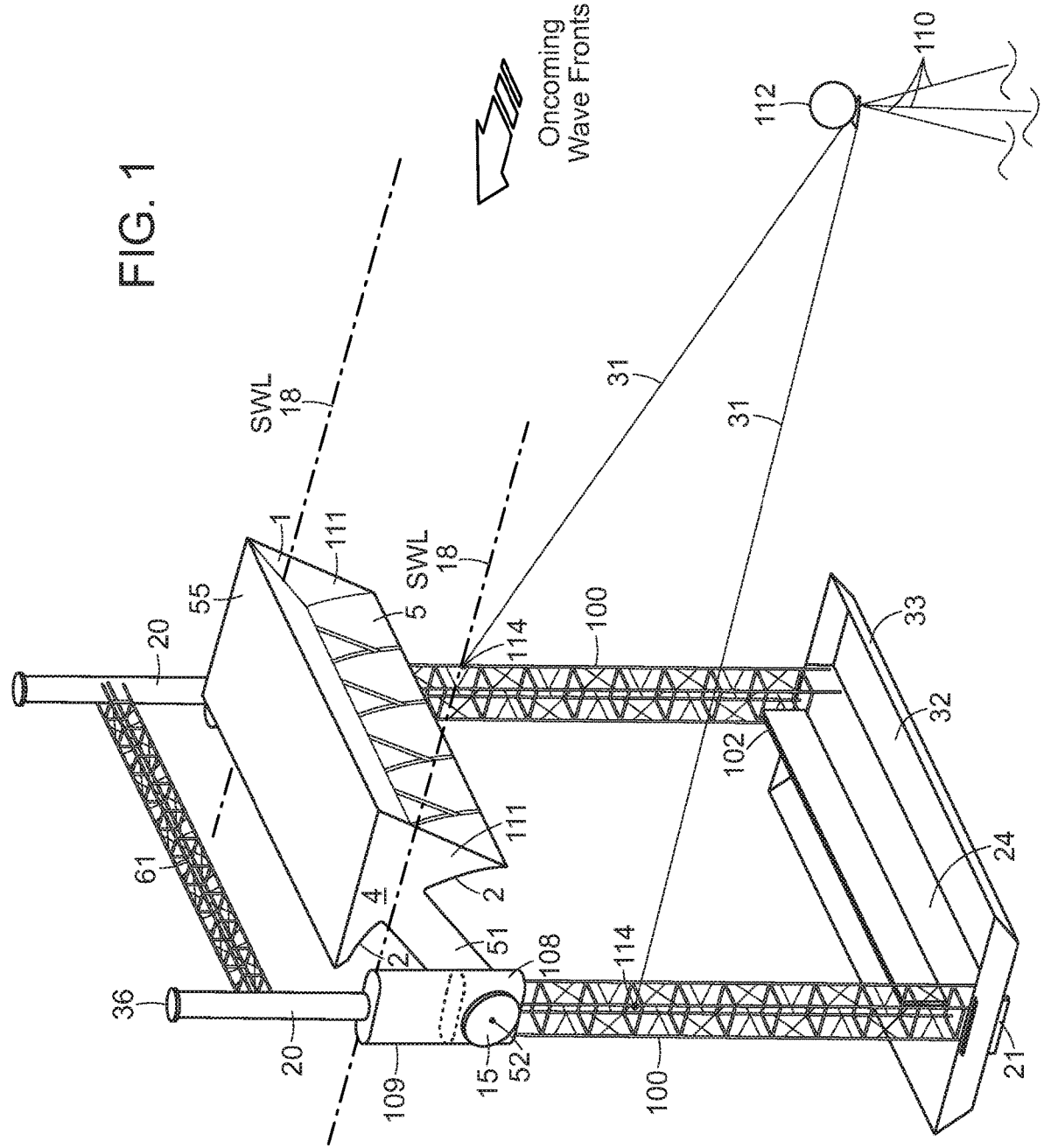
FIG. 1 is an isometric view of a wave energy capture device according to a further embodiment of the disclosure including mooring lines utilizing a frame comprised of two vertical spars where the port to starboard width of the float at full scale is 28 meters and which is designed to produce about 1.5 MW in 4-meter-wave height-seas according to one embodiment of the disclosure.

Referring to FIG. 1, a two-body WEC comprising a first body elongated wave front parallel surface float 4 (having deck 55, front face 1, rear wall 2 with lower extension 5, and side shields 111) is shown attached via swing or drive arms 51, pivoting about point 52, to a second semi-submersed twin vertical spar frame or body (having 20 upper frame column with top access hatch 36, mid-frame 109 w PTO 5 housing, 100 lower frame, and 61 frame cross beam) pivotably attached 114 to a submersed buoyant mooring buoy 112 by twin mooring cables 31 which mooring buoy is affixed to the seabed by three tensioned mooring cables 110. This embodiment achieves several of the objectives of the subject disclosure including; 1. A second body (twin vertical spar semi-submersible frame) partially stabilized against unwanted heave and pitch motion by both horizontal 32 and vertical 33 and 102 drag plates, seawater ballast in ballast tank 108, and solid ballast 21, 2. Self-orientation of the Float 4 parallel to oncoming wave fronts via weathervane type pivoting about the submerged buoyant mooring ball 112 while providing tidal level compensation using lateral mooring lines 31 3. a rotary input PTO 15 in or affixed to the frame directly driven by drive arms 51 from the one or more adjacent floats, 4. A float 4 which can be flooded and submerged and rotated (360° or to the 6 o'clock position) for protection during severe seas, 5. A concave arcuate float back 2 which produces little or no energy consuming "back wave" when driven backwards by wave forces impacting the front 1 of the Float 4 while concurrently lifting the float via its buoyancy.

Figure 2:
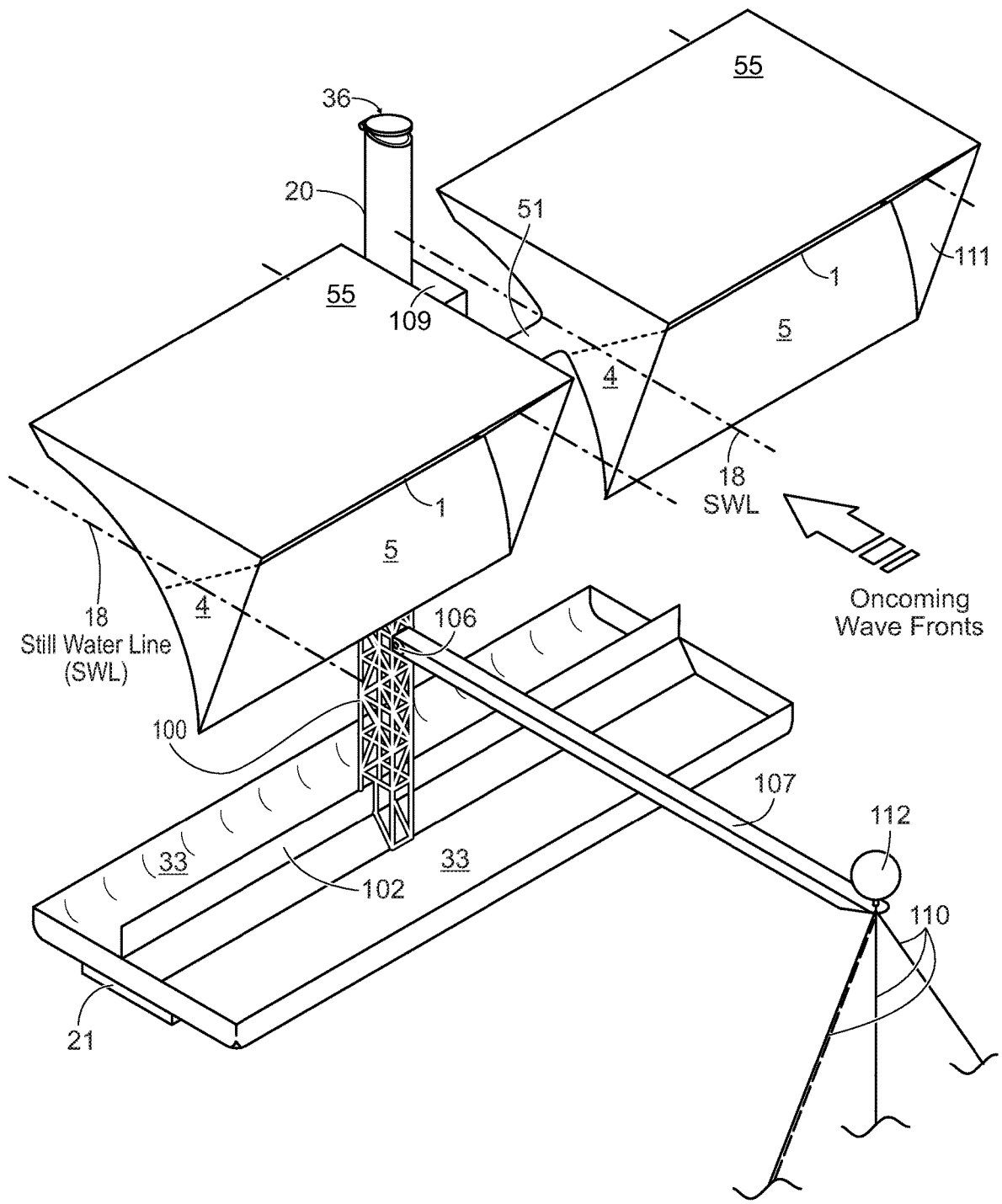
FIG. 2 is a perspective view according to another embodiment of the disclosure utilizing a single vertical truss frame with two adjacent floats each connected to the frame and its PTO via a single swing arm and having a mono-spar reaction body.
Figure 3B:
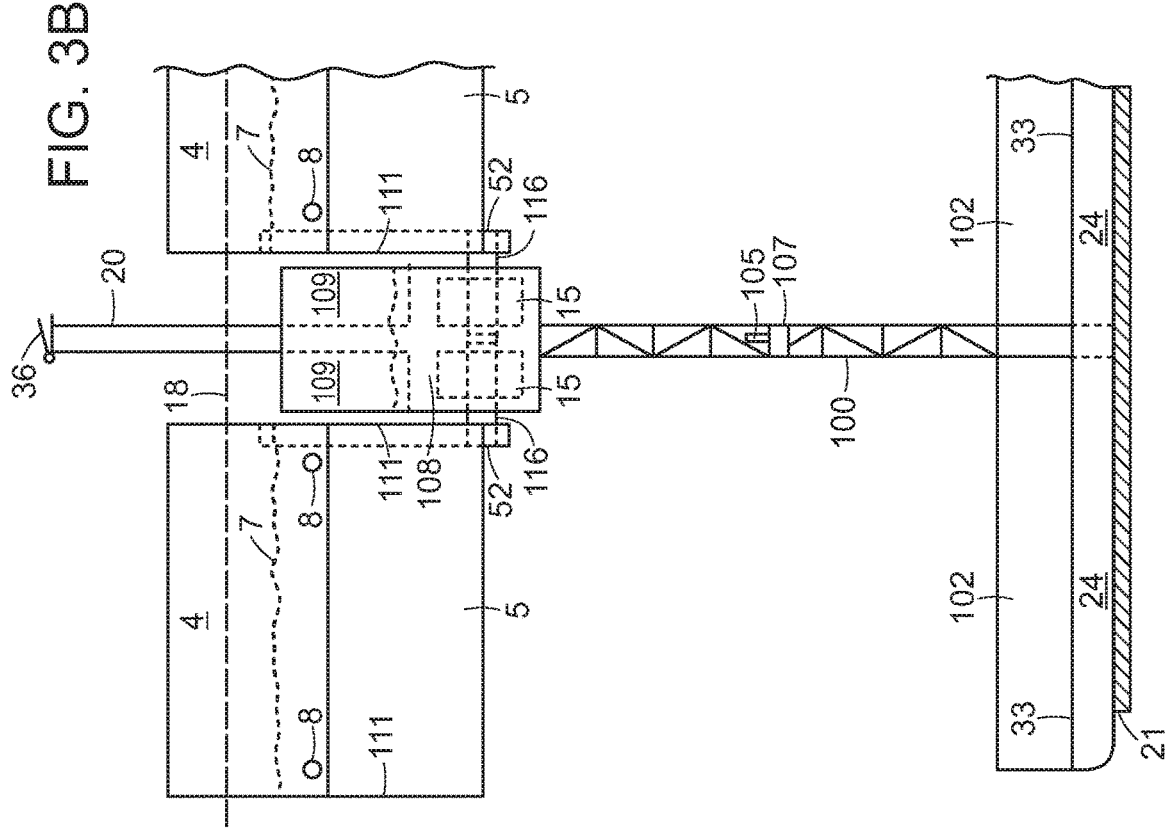
FIG. 3B is a front elevation view of the embodiment shown in FIG. 2.
Figure 3A:
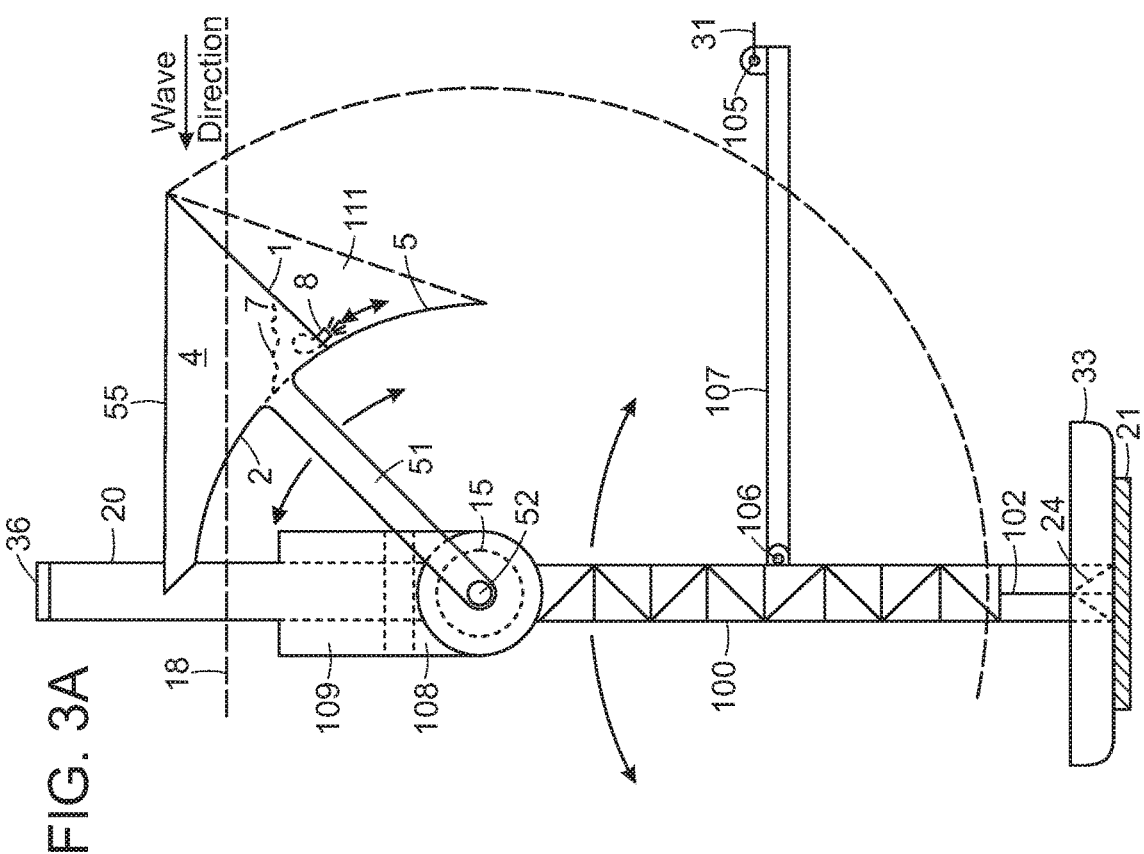
FIG. 3A is a side elevation view of the embodiment shown in FIG. 2.

Referring now to FIGS. 2, 3A, and 3B, a WEC similar to FIG. 1 is disclosed but utilizing a single vertical spar frame (again 20 upper, 109 mid, and 100 lower) with two adjacent elongated wave-front parallel floats 4 (rather than one) with drive arms 51 driving a single or twin PTOs 15 through drive axels 116 which PTOs are within or attached to the spar frame, which frame is pivotably attached to a similar submerged buoyant mooring buoy 112 by a lateral beam 107 rather than the two lateral mooring lines 31 shown in FIG. 1. The at least one inner cavity in float 4 can be partially or fully flooded with seawater 7 through controllable apertures 8 to alter float 4 mass and buoyancy. This mono-spar frame provides substantial reduced cost ("CapEx") over the prior twin spar frame of FIG. 1. FIGS. 5 through 9, herein (and Provisional Applications 62/707,920 FIGS. 5, 6, and 7 and 62/762,534 FIGS. 5 through 9) describe a dual or mono-spar frame with attachment to a submerged buoyant mooring buoy 112 by a lateral beam 107 but in prior '356 the lateral beam 107 is rotatably attached to the second body twin or mono-spar frame by pivoting connection 106 whereas in the present disclosure, and Provisional '920, the connection between the spar frame 119, which can have either a single or twin spar, is a rigid connection. This rigid connection, and tensioned seabed affixed cables 110 reduces both frame rearward pitching and upward heaving in response to wave crests which both lift and rotate float 4 upwards and rearwards as the PTO 15 resists such wave forces. The Still Water Line (SWL) is represented as line 18.

While the floats 4 shown in FIGS. 1-3 utilize single swing or drive arm pairs 51 rigidly connected to float 4, dual swing or drive arm pairs as described in FIG. 8 of Ser. No. 10/094,356, elements 51 and 82, could have been utilized in FIGS. 1-3 or any of the following embodiments of the present disclosure. When dual swing or drive arm pairs are utilized, with one arm above the second, both connections of the dual arms 51 and 82, to float 4 are pivoting, not fixed or rigid as in FIGS. 1-3 herein. Either arm, upper 51 or lower 82 can serve as the drive arm. Dual arms allow the orientation of float 4 to be controlled throughout its motion for somewhat higher wave energy capture efficiency in some wave conditions but at the expense of increased complexity. The upper and lower arms, 51 and 82, need not be of equal length or parallel.

Figure 4:
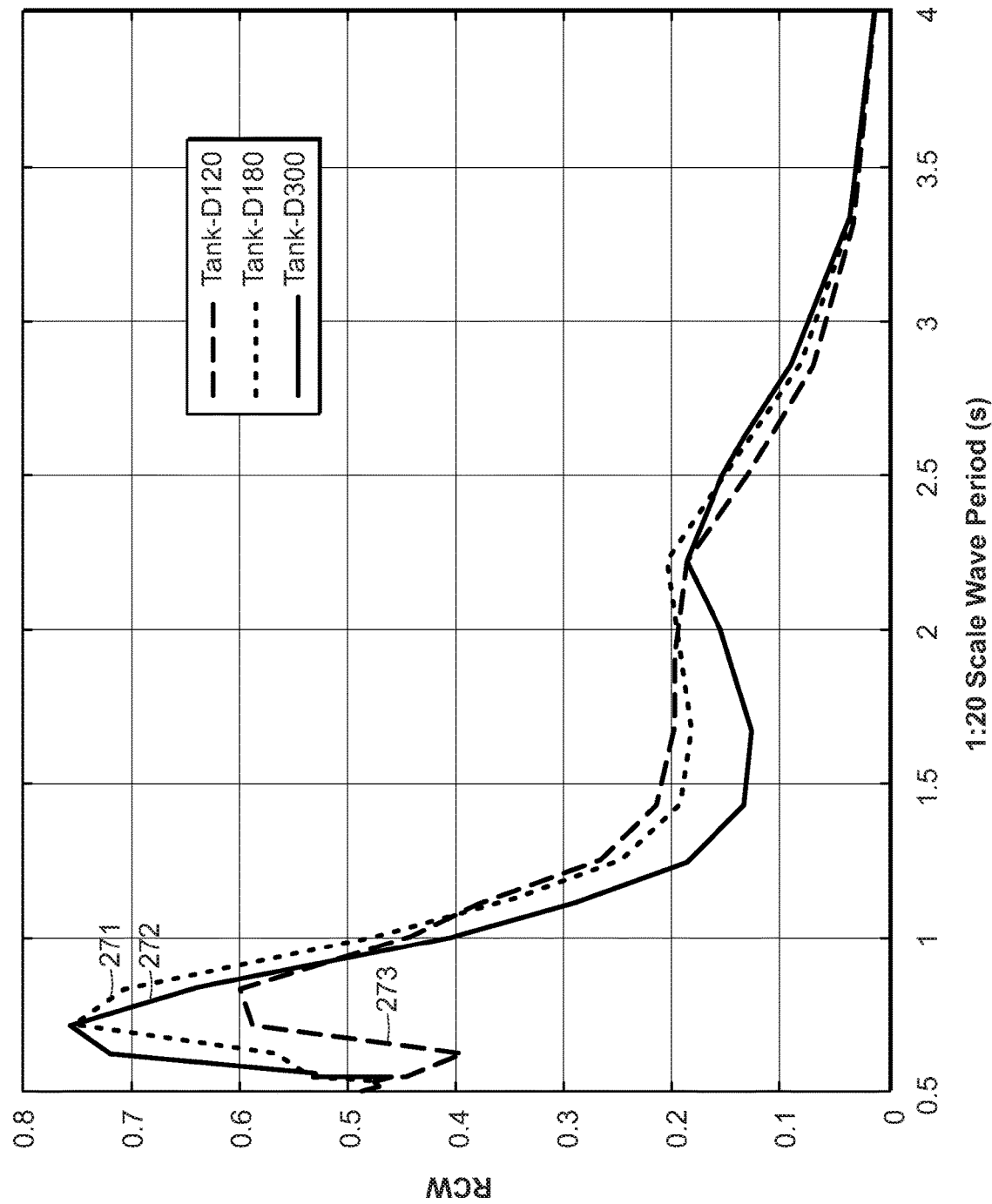
FIG. 4 is a plot of Relative Capture Width (wave energy capture efficiency) versus Wave Period from wave tank testing of the FIG. 1 WEC at ½0 scale according to one embodiment of the disclosure.

Referring now to FIG. 4, a plot (three lines 271, 272, 273) of Relative Capture Width (RCW) vs Wave Period (in seconds) of a ½0 scale WEC of the configuration shown in FIG. 1 tested with relatively large random (poly-chromatic) waves is shown. RCW is analogous to wave energy hydraulic capture efficiency (captured wave energy/total input wave energy) excluding PTO mechanical and electrical efficiency losses. These tests were performed at three different PTO damping torque levels (120, 180, and 300 Nm for plots 271, 272, and 273 respectively). While the random wave capture efficiency is extremely high, peaking at over 70% for shorter 0.7 second wave periods (corresponding to about 3.1 seconds at full ocean scale) efficiency drops substantially being only about 20% at 2.25 second periods (10.1 seconds at full ocean scale). Ideally, maintaining random wave capture efficiencies above 50% for typical 5-15 second ocean wave periods would be highly desirable (which no ocean deployed WEC has yet approached). Visual and video observation of the above tests clearly showed the frame (20 and 100) clearly start to pitch substantially rearward on wave crests during wave periods exceeding 0.7 seconds (3.1 seconds full scale). When more PTO damping torque was applied, rearward pitching became even more pronounced causing the float-to-frame relative motion and energy capture to decrease.

Most WECs utilizing two or more mechanically linked surface bodies (primarily articulator or terminator type WECs), like the above tests, are more efficient at capturing wave energy during shorter wave periods (under 5 seconds full scale). Those WECs that utilize longer (fore to aft) surface bodies and/or more mass (resulting in more cost or CapEx) can better absorb energy from longer period waves but are less responsive and efficient at energy capture from short-period waves. The embodiments shown in FIGS. 5-10 utilize mooring beam 107 to reduce this undesirable aftframe pitching without adding additional costly frame stabilizing mass, by producing a major counter moment transferred from the frame through mooring beam 107 to the seabed via mooring cables 110.

Figure 5:
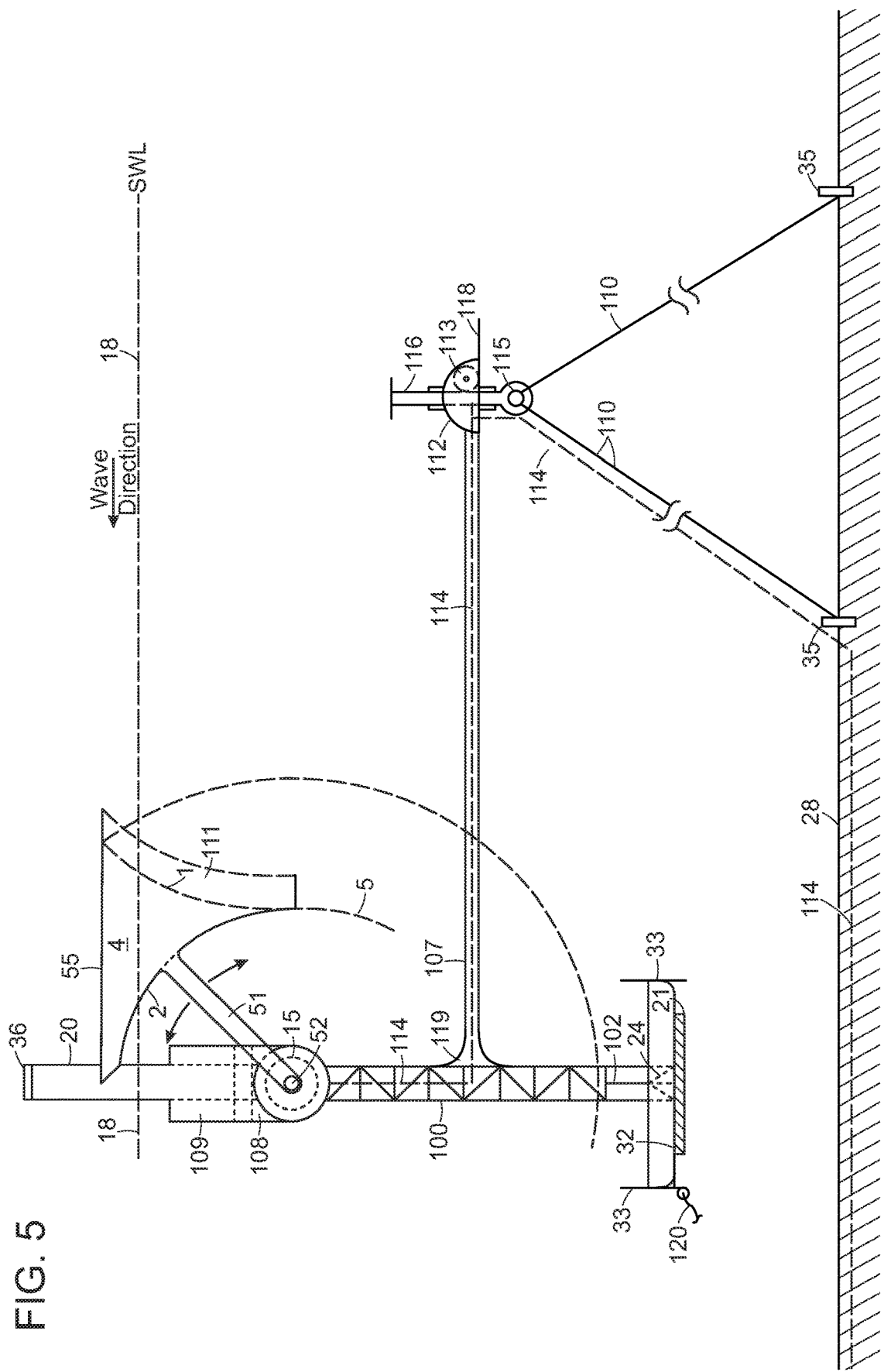
FIG. 5 is a side elevation view of a WEC utilizing an upright mono-spar with horizontal and vertical drag plates at its lower terminus, a rigidly affixed lateral mooring beam, and a submerged mooring buoy and point positioned via tensioned cables affixed to the seabed according to another embodiment of the disclosure.

Referring now to FIG. 5, another embodiment of the disclosed WECs is shown with several subtle though critical improvements over the prior embodiments shown in FIGS. 1, 2, 3A, and 3B. Both single and multi-body WECs require a reaction mass to resist and absorb wave-force-induced motion and do work. While this reaction mass can be provided by one or more of the WEC bodies, such as by using large fore-to-aft dimensions and large quantities of steel, or concrete gravity ballast mass, the effective use of entrained (using drag plates or planes) or contained seawater (within an enclosed vessel or cavity) generally provides lower cost or CapEx. Utilizing the seabed as reaction mass can result in even lower CapEx even for deep water deployed WECs where the seabed mass can be utilized by connection with one or more tensioned cables 110 or legs 136 shown in FIGS. 5 and 6 (which also show the routing of power export and communications/control cables 114 from the PTO 15 housing along mooring beam 107, down tensioned cable 110 through seabed attachment means 35, along the seabed 28 back to shore.

The embodiment shown in FIG. 5 is similar to the prior embodiments of FIGS. 2, 3A and 3B except the connection between the vertical spar frame, 100 and 20, and lateral beam 107 at juncture 119 is rigid rather than hinged (as shown in FIGS. 2 and 3 element 106). Alternatively, the connection at juncture 119 can be hinged at the top of the connection between spar column 100 and lateral beam 107 and configured such that counter clockwise rotation beyond the original orientation angle between spar 100 and beam 107 (about 90° as shown) is blocked while clockwise rotation during pitch recovery between wave crests is accommodated.

While FIG. 5 shows a mono-spar frame, two mooring beams (each like 107) also can be rigidly mounted at 119 to a twin spar frame (like as shown in FIG. 1) and converge at a submerged mooring float 112 as shown in FIG. 5. When vertical (heave) and lateral (surge) wave forces from each oncoming wave crest both lift upward and rotate rearward, respectively, float 4, such rotation is resisted by the damping torque applied by PTO 15 within or affixed to spar frame 100, 109, and 20. Such PTO damping torque causes the spar frame 100, 109, and 20 of FIGS. 1, 2, and 3 to rotate (pitch) rearward, reducing the relative motion between drive arm 51 and the frame mounted PTO 15 and hence also reducing the wave energy captured. The rigid frame 100 to lateral beam 107 connection shown in FIG. 5, however, resists the undesirable counter-clockwise aft pitching or rotation of frame 100 and 20 by applying through beam 107 and its rigid connection to the frame 119, an opposing moment at submerged mooring buoy 112 by its tensioned cable 110 connection to the seabed 35. If lateral movement of mooring buoy 112 is problematic, the angle between the fore cable 110 and horizontal can be reduced by increasing the fore cable 110 length.

Figure 6:
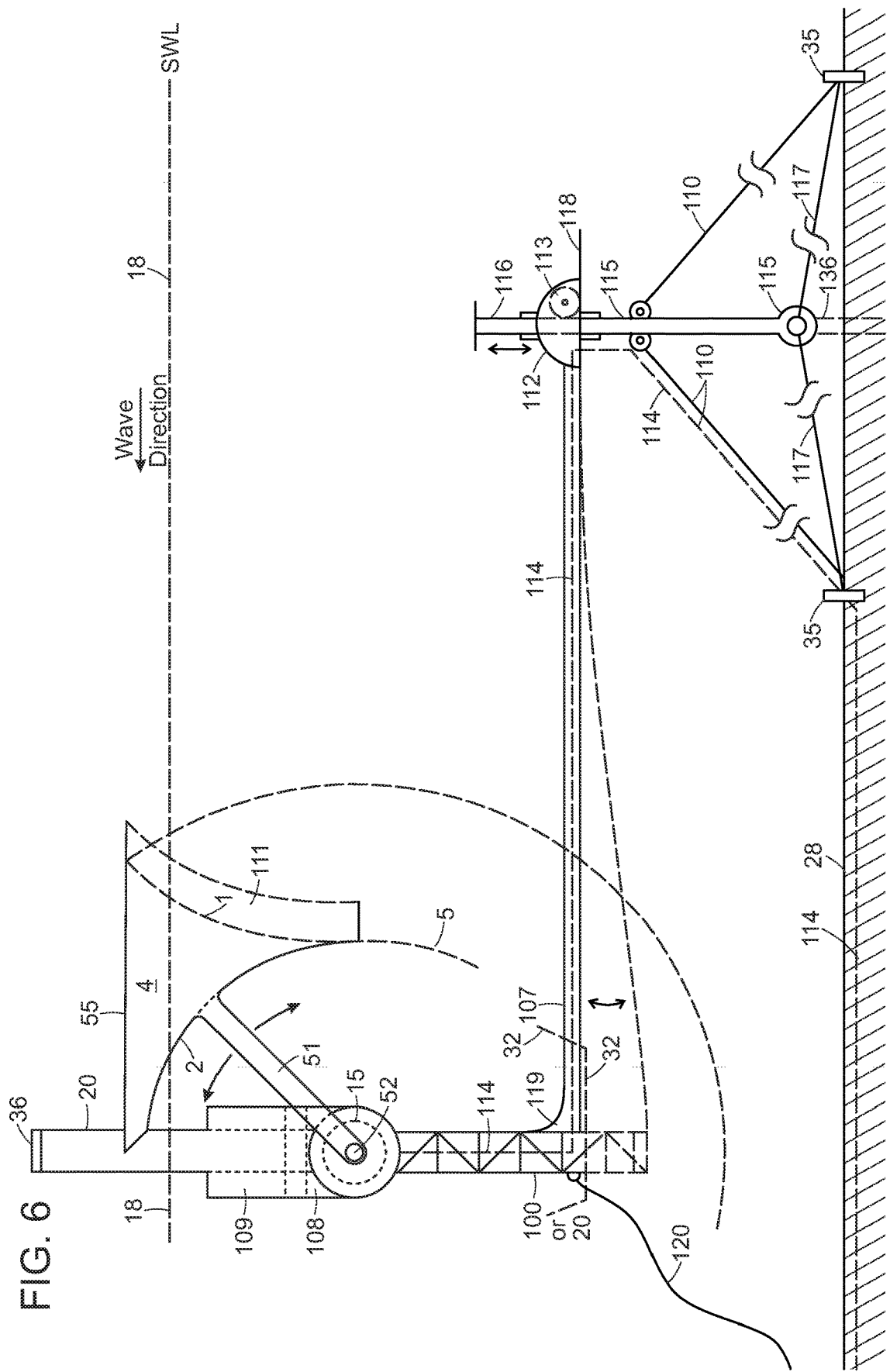
FIG. 6 is a side elevation view of a WEC similar to the WEC shown in FIG. 5 but without the lower mono-spar section and with the mooring buoy and point mounted on a mono-pile according to a further embodiment of the disclosure.

Horizontal drag plate 32 of the embodiments shown in FIGS. 1,2, and 3 with vertical seawater entrainment surfaces, 33 and 102, are also in the embodiments shown in FIGS. 5 and 6, to limit the upward vertical displacement of PTO input axis 52 which would also reduce the relative rotation (and energy capture) between drive arm 51 and PTO 15. Chamber 24 can hold additional seawater ballast while plate 21 provides additional solid ballast mass if needed. The upward vertical displacement forces on Frame 100 and 20 in the FIG. 5 embodiment are now, however, significantly reduced, or even eliminated, by the counter-clockwise moment about mooring buoy 112 provided by concurrent lateral wave forces applied against float 4 front face 1 and transmitted through and resisted by PTO 15. Elimination or substantial size reduction of the drag plate surfaces 33, 32, and 102 of the FIG. 5 embodiment further results in major WEC CapEx cost reduction.

Because the lateral beam 107 to frame 100 connection shown in FIG. 5 is now rigid, compensation for tidal changes to the SWL will produce changes to both the vertical orientation of the spar frame 100 and 20, and the lateral orientation of mooring beam 107 that are dependent on both the tidal range and the length of beam 107. If these changes are excessive, they can be easily accommodated by allowing the mooring buoy 112 to slide vertically on vertical mooring mounting shaft 116 and utilizing a hydraulic, electrical, or mechanical device 113 which allows slow (i.e. hourly) movement of the mooring buoy up and down the mounting shaft 116 but not 5-20 second wave-force-induced motions to alter the position of buoy 112 on shaft 116. Alternatively, the connection between lateral beam 107 and mooring buoy 112 can be pivoting or hinged (not shown). Slack secondary mooring line 120 can be utilized to prevent the WEC device from completely circling mooring buoy 112 which would either wrap power export and communications cables 114 or require slip ring electrical connections.

Referring now to FIG. 6, an embodiment of the present disclosure is shown wherein the expensive drag plate surfaces 32, 33, and 102 and gravity mass 21 of the embodiment shown in FIG. 5 are eliminated or substantially reduced in size. The lower portion of vertical spar 100 is likewise eliminated. The moment produced by lateral (surge) wave forces acting on front face 1 of float 4 about submerged mooring buoy 112 approximately counteracts the vertical heave wave forces acting on float 4 that keeps PTO input axis point 52 relatively stationary in both rotation and translation, recognizing that the timing and magnitude of the surge and heave moments each vary with different timing throughout each complete wave cycle (typically 5 to 20 seconds in deep ocean water). Reduction of unwanted rotation (aft pitching) of frame 100 with attached or integral PTO about mooring point 112 can be further facilitated by maintaining vertical shaft 116 in a stationary upright position resisting bending moments applied by mooring beam 107. This additional aft pitching resistance can be done by extending mooring buoy vertical slide shaft 116 downward and attaching second mooring cables 117 which attachment points to 115 are substantially below the attachments of cables 110. Alternatively, or additionally, depending on water depth, shaft 116 can be extended into the seabed with shaft extension 136.

Use of supplemental tensioned mooring cables 117 or mooring vertical shaft extension 136 to the seabed converts the junction of mooring beam 107 and the vertical mooring shaft into an angularly rigid connection (which remains free to pivot in a lateral plane to facilitate the desirable weathervane orienting of the WEC floats parallel to oncoming wave fronts). Mooring beam 107 can be made somewhat flexible to reduce the structural loads on juncture 119 and 116 to mooring beam 107 transmitted down cables 110 and 117 to seabed attachments 35 caused by occasional severe waves. If additional stabilization of frame 100 with PTO 15 against vertical heave translation or rotation about submerged mooring buoy 112 is required, vertical drag plate 32 (dotted) with optional upward 33 (shown) or downward (not shown) oriented edges can be utilized either under frame 100 (shown) or aft of frame 100 mounted to an aft-ward extension of beam 107 (not shown).

Figure 7:
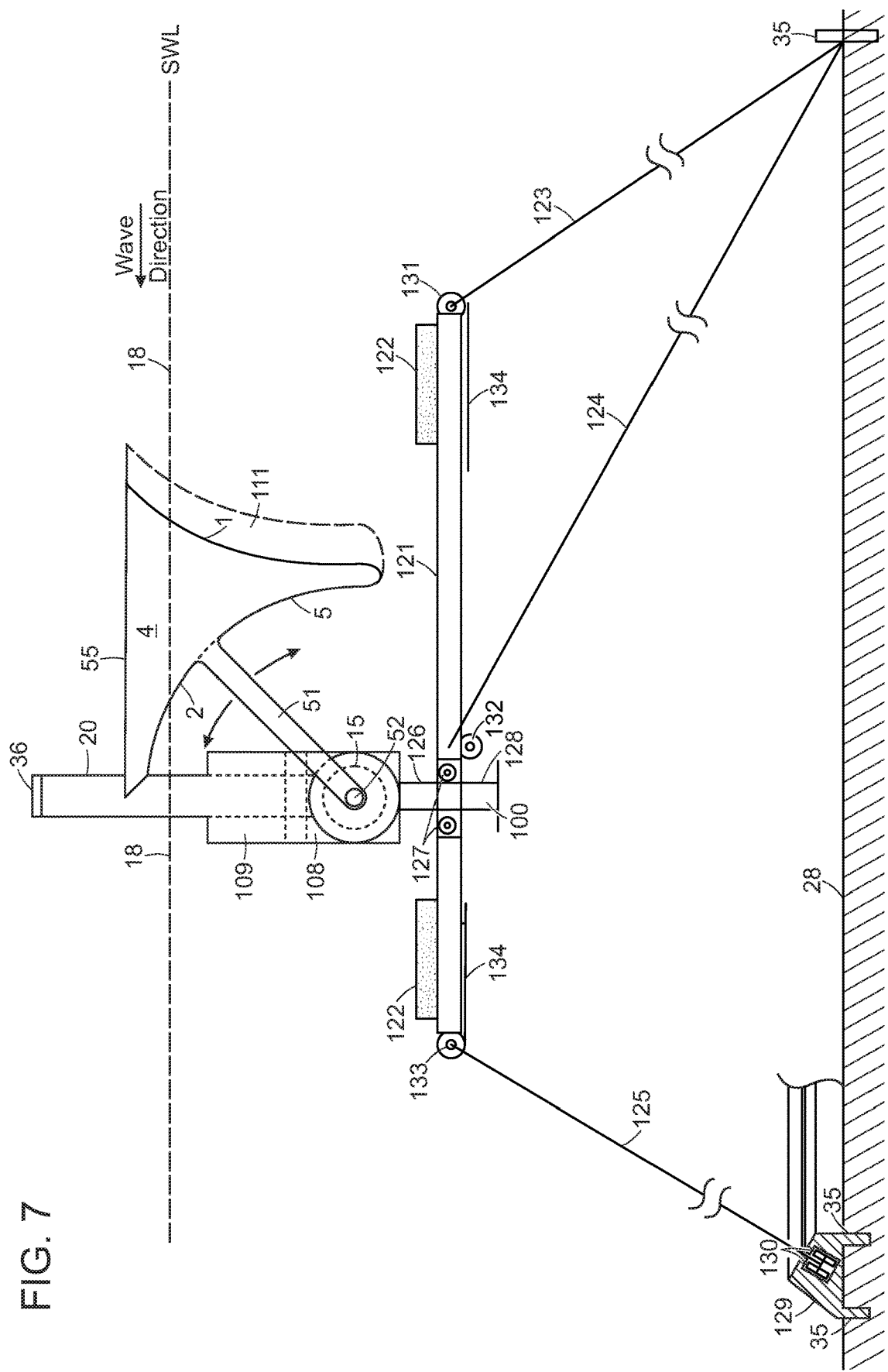
FIG. 7 is a side elevation view of a WEC with a mono-spar supported by a submerged lateral beam positioned via tensioned cables affixed to the seabed according to a yet further embodiment of the disclosure.

Referring now to FIG. 7, a WEC is shown that incorporates a submerged lateral beam 121 that may be buoyant, rather than the mooring beam 107 and mooring buoy 112 components of the previously described embodiments. Undesirable vertical displacement of PTO input axis 52 is resisted by tensioned cables 123 and 124, attached to the seabed at 35, and optional supplemental tensioned cable 125. Undesirable (aft-ward or counter-clockwise) pitching of vertical spar(s) 20 and 100 are resisted by fore and aft horizontal drag plates 134 and/or contained or entrained seawater mass 122 affixed to the fore and aft ends of lateral beam 121 combined with tensioned cables 123 and 124, and optional cable 125. Hydraulic, electric, or mechanical means 127 allow slow vertical movement of the mono-spar or twin spar lower frame section 126 using rack gears 128, for tidal compensation while preventing rapid wave force induced motion between lower frame 100 and beam 121. If optional cable 125 is utilized, self-orientation (weathervaning) of the at least one float 4 is maintained by attaching a roller 130 or sliding connection between the lower portion of cable 125 and a substantially horizontal circular or semi-circular tracking mechanism 129.

Figure 8B:
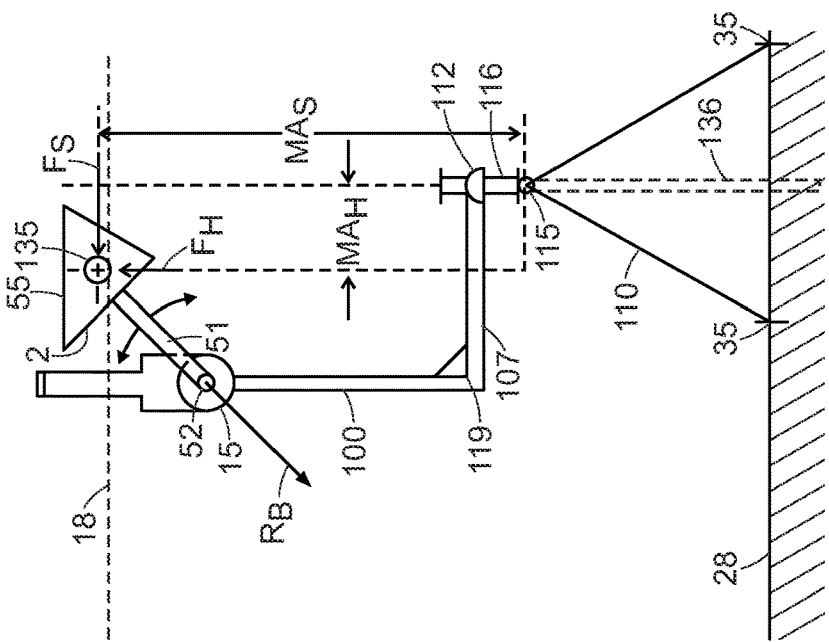
FIG. 8B is a side elevation view of a WEC similar to the WEC embodiment shown in FIG. 6 with a relatively long lower mono-spar depth and a relatively short lateral mooring beam length according to a still further embodiment of the disclosure.
Figure 8A:
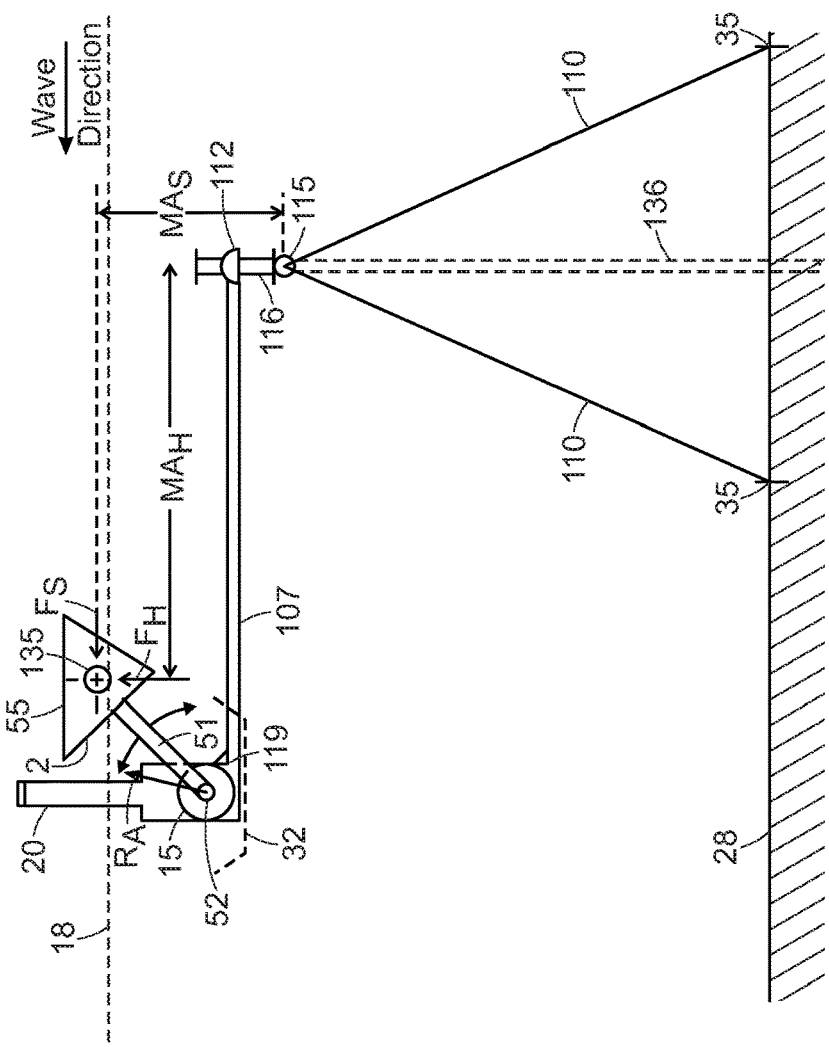
FIG. 8A is a side elevation view of a WEC similar to the WEC embodiment shown in FIG. 6 with a relatively short lower mono-spar depth (none) and relatively long mooring beam length according to yet another embodiment of the disclosure.

Referring now to FIGS. 8A and 8B, a WEC apparatus having the same features as the embodiments shown in in FIGS. 5 and 6 including the rigid vertical spar frame to mooring beam connection at junction 119 but with the horizontal drag plate 32 (dotted) either eliminated or having a reduced area. FIGS. 8A and 8B illustrate how unwanted wave-heave-force-induced vertical displacement of PTO input axis 52 or unwanted counter-clockwise rotational (pitching) displacement about PTO input axis 52 can be substantially or totally eliminated without the use of costly ballasts or drag plates by optimal configuration of the dimensions of lateral beam(s) 107 and vertical frame spar(s) 100.

Both the heave and surge forces acting on the center of buoyancy 135 and the forward wave-impacting face of float 4, respectively, during each wave cycle will change during each wave cycle but these forces are comparable since heave and surge wave energy components are identical in deep water waves. If as shown in FIG. 8A, mooring beam 107 and the lateral distance to the center of buoyancy of float 4 is long relative to pivot point 115 below mooring ball 112, then the heave moment arm $MA_H$ producing unwanted vertical upward translation of PTO input axel 52 is large compared to the countering surge moment arm $MA_S$ and the resultant force vector and translation of PTO axel 52, shown as vector $R_A$, is upward as shown in FIG. 8A, which is undesirable and will reduce the relative motion between drive arm 51 and PTO input axel 52. If, on the other hand, as shown in FIG. 8B, the vertical distance from pivot point 115 to the float 4 center of buoyancy is large relative to their lateral distance, then the surge moment arm $MA_S$ is large relative to the heave moment arm $MA_H$ and the PTO input axel will move downward and rearward with each wave crest, the opposite of FIG. 8A. The orientation of lower frame spar 100 and mooring beam 107 need not be at right angles as shown and can be combined into a single inclined or curvilinear beam (not shown) without changing the heave or surge moment arms. Between case 8A and case 8B the present disclosure utilizes an optimum ratio of $MA_H/MA_S$ where the translation and pitch rotation of PTO input axel 52 is minimized throughout the average wave cycle for maximum wave energy capture efficiency. Changing the applied PTO 15 resistive or damping torque throughout each wave cycle will also change the heave and surge moments during each cycle.

Figure 9A:
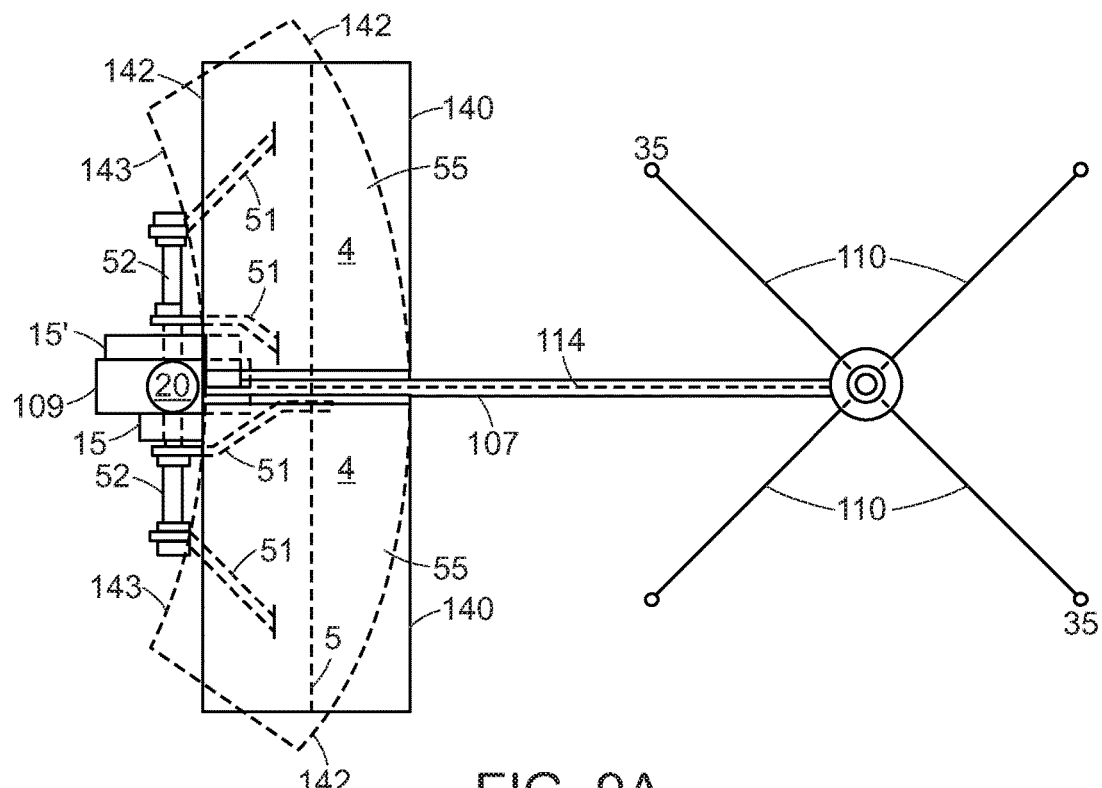
FIG. 9A is a plan view of the WEC apparatus shown in FIG. 8A with a relatively smaller diameter geared generator PTO and a large diameter direct drive (ungeared) PTO according to yet another embodiment of the disclosure.
Figure 9B:
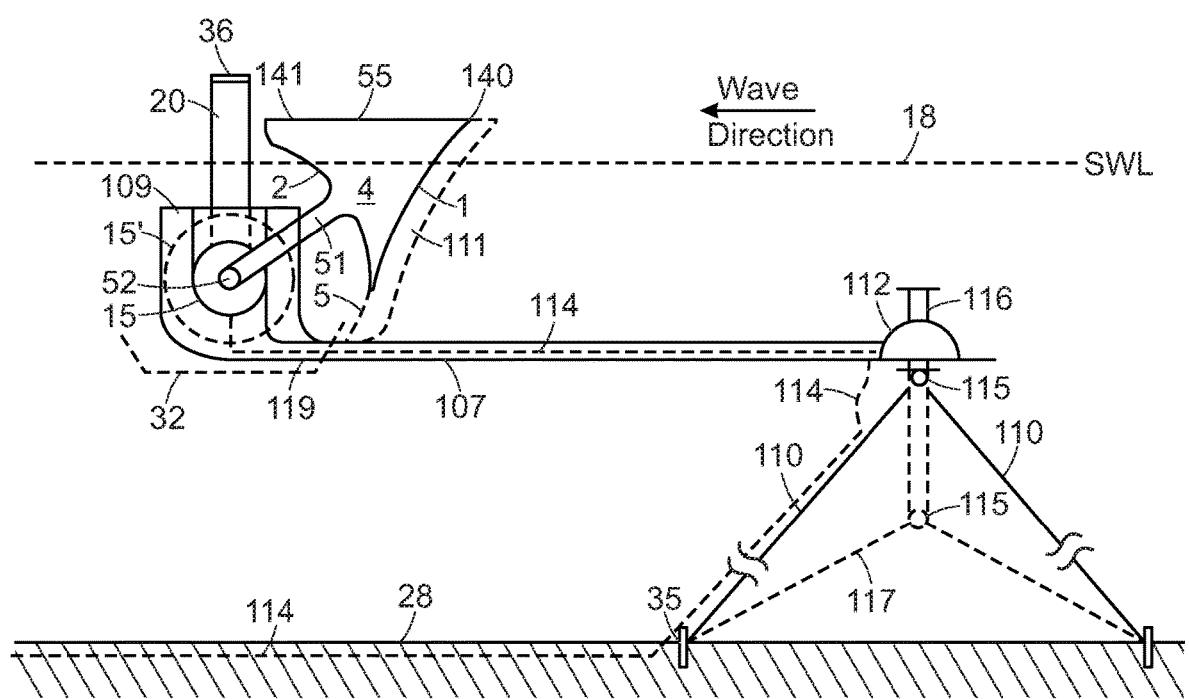
FIG. 9B is a side elevation view of the WEC apparatus shown in FIG. 8A with a relatively smaller diameter geared generator PTO and a large diameter direct drive (ungeared) PTO according to a further embodiment of the disclosure.

Referring now to FIGS. 9A and 9B, a WEC apparatus shown in plan and side elevation views, respectively, has features similar to the WEC apparatus shown in FIGS. 5 through 8. In this embodiment, the use of beam 107 and its rigid connection to the lower portion of the second reaction body or frame creates a wave-induced surge moment about pivot point 115 that counters the heave moment about 115 reducing the area or completely eliminating the need for horizontal drag plates 32. FIGS. 9A and 9B show a monospar frame 20 with a twin float 4 embodiment with wavefront-parallel horizontal plane straight-line float front faces 140 or alternatively convex curvilinear front faces 142. In many ocean wave conditions, especially those involving multi-directional and multi-wave length waves, a float with straight forward face 140 will intercept and capture more wave energy per cubic meter, tonne, and hence cost per float. In some sea conditions, especially unidirectional waves of relatively uniform period and height, a curvilinear convex float front face, or in this case twin adjacent curvilinear convex float front faces 142, will have some wave focusing point absorber effect that can result in higher wave energy capture efficiency.

FIGS. 9A and 9B also illustrate that the WEC apparatus disclosed herein can utilize a relatively small size rotary input PTO 15 that may be a single or twin (one for each float) low input RPM high torque geared multi-pole permanent magnet AC synchronous motor-generator (PMSC) like those now used in large wind turbines, or a larger diameter PTO 15' can be utilized that may be an ungeared PMSC motor-generator that are generally costlier but also now utilized in large wind turbines. Alternatively, each float PTO input axel 116 axis 52 can be connected to a single or twin large diameter internal or external toothed bull gear(s), each directly driving a single or multiple smaller generator drive gear(s) (not shown). While FIGS. 2, 3, 5, 6, 7, 8, 9, and 10 all show the mooring beam 107 as relatively horizontal, this is not necessary as the relative horizontal and vertical distances between the float center of buoyancy and the mooring buoy pivot point determine the desired stabilizing moments, not the orientation or shape of mooring beam 107. Power export and communication cable 114 is routed as shown in FIG. 5.

Embodiments of the present disclosure can utilize either single PTO or multiple PTOs. When multiple adjacent floats 4 are utilized, they can drive a common PTO input axel 116 axis 52. Alternatively, single or multi-float embodiments can utilize multiple PTOs including using one PTO for the primary power stroke, when wave crests concurrently raise the float 4 while driving it rearward. A second PTO can be used to capture energy on the return stroke thus, if desired, limiting each PTO to a single direction of rotation by using one-way clutches or clutch bearings.

Embodiments of the present disclosure also can utilize one float 4 or multiple adjacent floats with or without the arcuate extension 5 illustrated in FIG. 1, 2, 3, 5, 6, or 9 and without part or all of the float back 2 combined with any arcuate extension 5 being concave or semi-circular about a center at or near float arm 51 pivot point 52. The use of at least one partial or total non-concave or non-semi-circular float back and/or lower extension, however, will displace more water behind the float as the float is displaced upwardly and rearwardly in response to each oncoming wave which displacement will produce a back wave that will transport away a portion of the wave energy otherwise captured by the WEC.

The float back 2 of the present disclosure with or without any attached or float integral lower extension 5, whether concave arcuate (as shown in FIG. 1,2,3,5,6, or 9), flat and inclined (FIG. 8) or other shapes (not shown) can span an arcuate length about PTO input point 52 of as little as 30 degrees or as much as 270 degrees, or can be not less than about 30° and not more than about 225°. It is desirable, however, to have the float draft equal to the average wave height or at least a substantial portion thereof, such that it protrudes significantly down into the water column.

Figure 10:
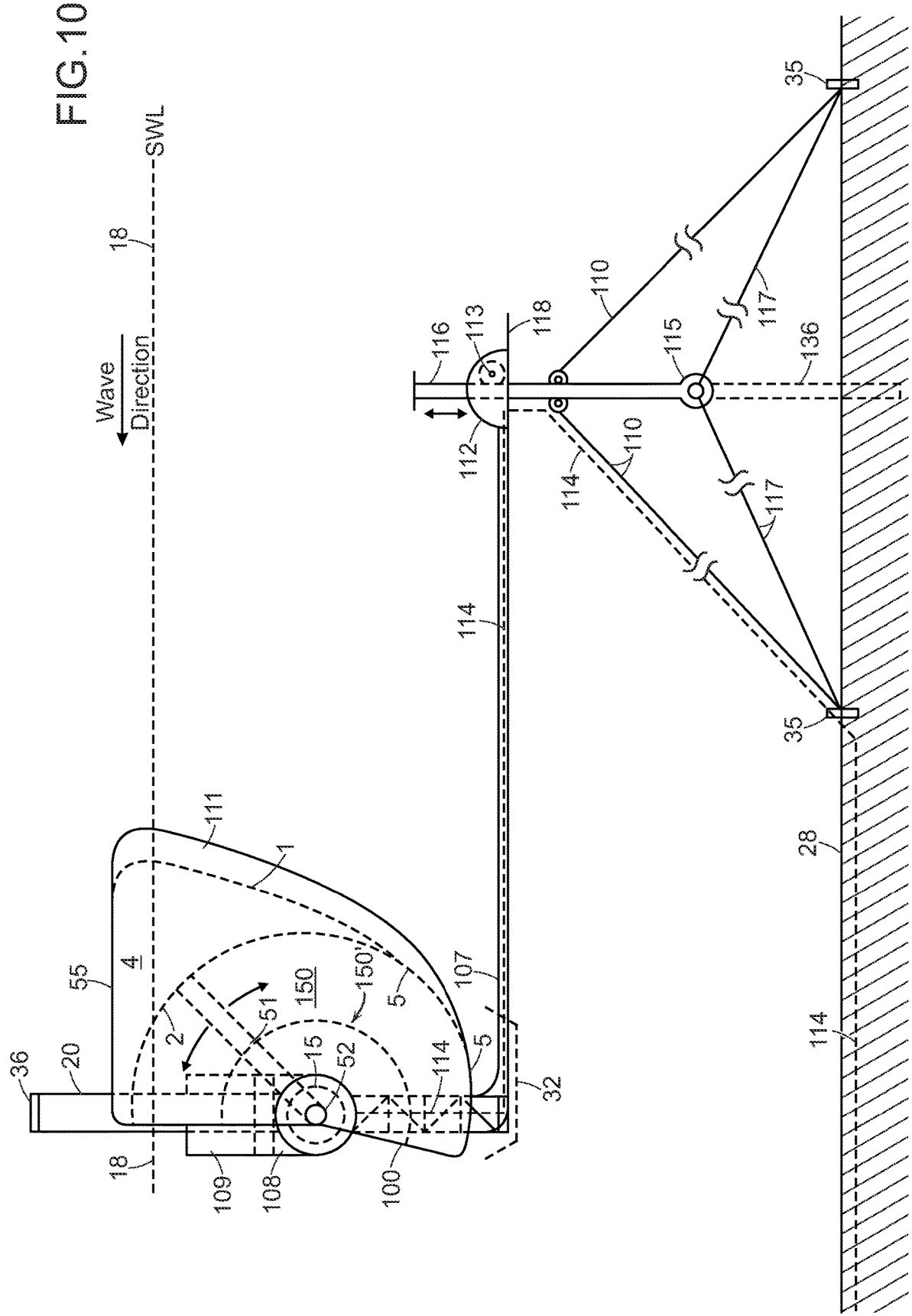
FIG. 10 is a side elevation view of a WEC similar to the WEC shown in FIG. 6 having a convex versus a concave float front face and upright side plates or shields on the port and starboard sides of the floats according to yet another embodiment of the disclosure.

Referring now to FIG. 10, a WEC apparatus is shown with a central single spar (20 and 100) and two floats 4 having a convex front face 1, an arcuate semi-circular rear wall 2, and a concave (when viewed from the rear) lower float extension 5 integral with the lower float body 4. The arcuate length (including the integral lower float extension 5) about the PTO input shaft center axis 52 is large (over 180 degrees) relative to most other illustrated embodiments of the present disclosure (which range from 60 to 90 degrees). Also shown are substantially upright partial 150' (dotted line) or full 150 (solid line) aft float side plates extending rearward from the float(s) 4 rear wall 2 that entrap water mass behind the rear float walls 2 and reduce rearward frame 20 and 100 from pitching while preventing entrapped water mass behind the rear wall 2 from escaping around the float rear wall edges. Also shown are optional forward float side shields 111 that prevent energy containing oncoming wave water from spilling around the float 4 front 1 lateral edges. While a convex float forward face can slightly increase float volume and cost, it provides certain hydrodynamic efficiency advantages (including protruding deeper into the water column) and is still much less costly than utilizing the large diameter stationary central cylinder of the Salter Duck and other more recent "Duck Derivative" WECs like the Columbia StingRay and the WEPTOS WECs.

The float front face 1 of the present disclosure is shown in FIGS. 1,2,3, and 8 as flat and inclined upward and outward while the float front face 1 in FIGS. 5,6, and 7 (when viewed from the front) are concave (also upward and outward) and the front face 1 of FIG. 10 is shown as convex. The lower float extension 5 is shown as convex (when viewed from the front and concave from the back) in several embodiments or flat in others. All front face and lower float extension shapes or combinations of shapes are included within the present disclosure. The selection of the front face and any lower extension shape is dependent upon the arcuate length of the float back 2 (with any lower extension 5), the float draft relative to average and extreme wave height, and other hydrodynamic factors.

All of the embodiments of the present disclosure described in FIGS. 5-10 utilize substantially more mooring cable 110 (or 123, 124, 125 in FIG. 7) tension than the prior embodiments of FIGS. 1-3 because the cable connection to the seabed utilizes seabed mass to help motion stabilize second body or frame 20, 100 through its rigid connection 119 to mooring beam 114. Large waves impacting float 4 front face 1 can produce high instantaneous "snap loads", especially on the fore cable 110 or its seabed anchor or connection 35. While not explicitly shown, there are numerous marine cable shock absorber mechanisms to absorb and reduce cable "snap loads" which could be utilized. Motion stabilization can be accomplished also with the application of mooring lines, submerged or surface mooring buoys, seabed affixed or semi-submerged spars, pilings or towers, drag plates or planes, liquid or solid ballasts, seabed attachments, gravity weights, piers, platforms, docks, breakwaters, seawalls, shorelines, barges, ships, floating vessels, and combinations of these motion-stabilization devices.

Embodiments of the present disclosure shown in FIGS. 1-3 and 5-10 all utilize swing or drive arms 51 of a fixed length. Any of these embodiments can utilize variable-length drive arms as shown in parent patent Ser. No.

10/094,356 FIG. 7, which arm length could be controllably varied during wave cycles (as shown in FIG. 7 of the '356 patent) or manually changed to accommodate seasonal changes in average wave height at any given deployment site.

Embodiments of the present disclosure described in FIGS. 1 through 10 are not restricted to electric or hydraulic PTOs utilizing rotary inputs. The drive axis 52 and axel(s) 116 of the present disclosure can include a crank mechanism attached to a linear hydraulic cylinder, linear electric generator, or ball screw or other linear mechanical drive. The crank can be so arranged such that the float(s) 4 of any of the embodiments of the present disclosure can still rotate a full 360° without mechanical interference with the mono-spar or multi-spar frame 100, drag plates 33, mooring beam 107 or other WEC components.

What I claim as new and desire to secure a United States Letters Patent is:

1. A wave energy converting device for converting an energy of water waves into electrical power, pressurized fluid, or other useful or transportable energy comprising:
    at least one float having a buoyant float body with a center of buoyancy;
    a base comprising a body or frame having at least one base pivot point or base pivot axis to which the at least one float is movably connected by at least one swing or drive arm to which the at least one base pivot point or base pivot axis is located substantially aft or down-sea of the at least one float's center of buoyancy and substantially below a still water line (SWL), wherein the at least one swing or drive arm controls an orientation and path of a wave-induced relative motion between the at least one float and the base;
    a submerged first mooring connection point which point's position is motion stabilized, restrained, or fixed by at least one device selected from the group consisting of mooring lines, submerged or surface mooring buoys, seabed affixed or semi-submerged spars, pilings or towers, drag plates or planes, liquid or solid ballasts, seabed attachments, gravity weights, piers, platforms, docks, breakwaters, seawalls, shorelines, barges, ships, floating vessels, and combinations thereof;
    at least one elongated mooring beam rigidly connected to the base extending and pivotably connected in a horizontal or vertical plane to a position stabilized second mooring connection point which point is located both substantially fore or up-sea of, and below, the at least one float's center of buoyancy; and,
    at least one power take-off (PTO) apparatus secured to or within the base to be driven by at least one force generated by the wave-induced relative motion between the at least one float and the base through the at least one swing or drive arm, or to drive the float during certain portions of each wave cycle.

2. The device of claim 1 further comprising a second reaction body or frame secured to the at least one float, wherein the at least one float functions as a first reaction body, wherein the vertical and horizontal dimensions between the float's center of buoyancy and the first mooring connection point such that during a typical wave cycle, a force moment produced by wave lateral or surge forces applied to the at least one float is substantially countered by an opposing force moment produced by wave vertical heave or buoyant forces applied to the at least one float thus reducing or eliminating undesirable rotation about, or translation of, the at least one base pivot point or axis, which base rotation or translation would otherwise reduce the relative motion between the reaction body and the at least one float.

3. The device of claim 1 wherein the at least one float, has a wave front width greater than its front-to-back depth, excluding any float attachments, extensions, or appendages, and having a wave-impacting forward wall or face substantially linear, arcuate, or combinations thereof, in either vertical or horizontal plane section, which face is oriented or self-orienting parallel to prevailing or oncoming wave fronts.

4. The device of claim 1 wherein the at least one float comprises a rearward or aft facing rear wall which rear wall may be vertically upright or inclined and either linear or arcuate, or combinations thereof, or having a rear wall the majority of which, including any lower extensions thereof, is substantially arcuate and concave and having a radius of curvature approximating an arcuate wave-induced motion path of the rear wall about the at least one base pivot point or pivot axis and approximately concentric about the at least one pivot point or axis.

5. The device of claim 4 wherein the arcuate length of the rear wall about the at least one pivot point or axis, including lower extensions thereof, spans an arcuate angle of not less than about 30° and not more than about 225°.

6. The device of claim 1 wherein the at least one float has at least one internal cavity which can be controllably partially or fully flooded with seawater or drained through apertures to alter the at least one float's mass and buoyancy.

7. The device of claim 1 wherein the at least one float has at least one interior cavity and can be fully submerged with its center of gravity substantially below a float pivot point or axis during severe sea states either by at least partially seawater flooding at least one interior cavity or by forcibly rotating the at least one float downward using the at least one swing or drive arm, or combinations thereof, and can be subsequently raised to the surface and drained to resume power generation.

8. The device of claim 1 wherein the at least one float can be rotated about the base pivot point or axis a full 360° without mechanical interference with the base or attachments thereto.

9. The device of claim 1 wherein the base is an at least partially submerged frame comprised of at least one substantially upright spar with at least two floats each pivotably attached at a spar pivot point or axis either directly by at least one swing or drive arm or indirectly through at least one drive axle attached to the at least one swing or drive arm and at the at least one pivot point or axis.

10. The device of claim 9 wherein the at least one spar is semi-submerged and buoyant with a center of buoyancy substantially above its center of gravity.

11. The device of claim 1 wherein a lateral and a vertical position of the mooring connection point is stabilized by at least one tensioned seabed affixed cable connected to a buoyant fully-submerged or semi-submerged mooring buoy or the spar.

12. The device of claim 1 wherein the lateral and vertical position of the mooring beam connection point is stabilized by a substantially upright buoy or the semi-submerged spar or column of which upright and lateral position is maintained either by its connection to a seabed or by its buoyancy and multiple tensioned seabed affixed cables attached to upper and lower positions on the substantially upright buoy or the spar or column.

13. The device of claim 12 wherein the mooring beam to mooring beam connection point is configured to allow the mooring beam to rotate in a horizontal plane to weather vane or self-orient to accommodate changes in wave front direction or to allow the mooring beam connection to slowly rise or fall vertically at the mooring beam connection point to accommodate rising or falling tidal changes in the SWL.

14. The device of claim 1 wherein the mooring beam is buoyant, and its forward end also provides the position stabilized mooring point, the beam being stabilized in a vertical plane by at least two tensioned cables rotatably attached to at least one seabed fixed point.

15. The device of claim 1 wherein the at least one float has substantially upright port and s tarboard sides, which sides are extended fore of a float forward wall or aft of a float rearward wall or lower extensions thereof to prevent water mass from spilling around sides of the buoyant float body.

16. The device of claim 1 wherein the length of the at least one swing or drive arm between the at least one float and the base pivot point can be expanded or contracted to accommodate seasonal variations in the average wave height.

17. The device of claim 1 wherein the base or frame further comprises chambers or cavities, internal to, or affixed to, the base wherein the buoyancy and elevation of the base relative to the SWL and the at least one base pivot point or axis can be increased or decreased by the admission or discharge of seawater from the chambers or cavities.

18. The device of claim 1 wherein the at least one swing or drive arm connected to the at least one float is comprised of two swing or drive arms or swing or drive arm pairs, one substantially above the other, wherein the two swing or drive arms are pivotably attached to the at least one float and to the base at two distinct swing or drive arm pivot points or pivot axes, such that the orientation of the at least one float is controlled throughout each wave cycle, at least one of the two arms driving the at least one PTO.

19. The device of claim 9 wherein the upright spar has at least one substantially horizontal surface drag plate or one vertical drag plate affixed at or near the bottom of the upright spar.

* * * * *